United States Patent
Ellis et al.

(10) Patent No.: US 10,760,403 B2
(45) Date of Patent: Sep. 1, 2020

(54) PIPE TALLY VISION SYSTEM

(71) Applicant: NABORS DRILLING TECHNOLOGIES USA, INC., Houston, TX (US)

(72) Inventors: Brian Ellis, Spring, TX (US); Adam Keith, Spring, TX (US)

(73) Assignee: NABORS DRILLING TECHNOLOGIES USA, INC., Houston, TX (US)

(*) Notice: Subject to any disclaimer, the term of this patent is extended or adjusted under 35 U.S.C. 154(b) by 126 days.

(21) Appl. No.: 16/146,554

(22) Filed: Sep. 28, 2018

(65) Prior Publication Data
US 2019/0100988 A1 Apr. 4, 2019

Related U.S. Application Data

(60) Provisional application No. 62/565,799, filed on Sep. 29, 2017.

(51) Int. Cl.
| | | |
|---|---|---|
| *E21B 47/00* | (2012.01) | |
| *E21B 17/00* | (2006.01) | |
| *E21B 19/00* | (2006.01) | |
| *E21B 33/06* | (2006.01) | |
| *E21B 33/08* | (2006.01) | |

(52) U.S. Cl.
CPC ............ *E21B 47/00* (2013.01); *E21B 17/006* (2013.01); *E21B 19/00* (2013.01); *E21B 33/061* (2013.01); *E21B 33/085* (2013.01)

(58) Field of Classification Search
CPC ........ E21B 19/00; E21B 19/14; E21B 19/146; E21B 19/15; E21B 19/155; E21B 19/16; E21B 19/18; E21B 19/20; E21B 19/24; E21B 47/00; E21B 17/006; E21B 33/061; E21B 33/085
See application file for complete search history.

(56) References Cited

U.S. PATENT DOCUMENTS

| | | | | |
|---|---|---|---|---|
| 2011/0024195 A1* | 2/2011 | Hoyer | ................... | E21B 33/085 175/65 |
| 2012/0241163 A1* | 9/2012 | Reitsma | ................... | E21B 19/09 166/355 |
| 2014/0107947 A1* | 4/2014 | Papadimitriou | .... | G01M 5/0033 702/34 |

* cited by examiner

*Primary Examiner* — David Carroll
(74) *Attorney, Agent, or Firm* — Adolph Locklar

(57) ABSTRACT

A pipe tally vision system may be positioned on a drilling rig. A drill string may be positioned within a wellbore using the drilling rig. The drill string may be observed with the pipe tally system during a wellbore operation. A pipe tally database may be generated by the pipe tally system based on the observations of the drill string made by the pipe tally system and observations may be made as the drill string is moved into or out of the wellbore.

11 Claims, 17 Drawing Sheets

FIG. 4A

Day Tour

BHA Information

| NO | Name | Active | Last Used (1) | |
|----|------|--------|---------------|---|
| 3 | CURVE | ☑ | 2016-01-13 | New |
| 2 | BHA2 | ☐ | 2016-01-08 | Delete |
| 1 | BHA1 | ☐ | 2015-12-23 | Export |
| | | | | Import |

BHA Items

| 1 | | Size | ID | Length | Magnetic |
|---|---|------|-----|--------|----------|
| 1 | BIT | 8.5 | 2.0 | 1.0 | YES |
| 1 | MOTOR, MUD | 6.75 | 2.0 | 29.01 | YES |
| 1 | PONY COLLAR | 6.75 | 2.625 | 11.81 | YES |
| 1 | COLLAR MP | 6.75 | 2.87 | 27.76 | YES |
| 1 | SPACER COLLAR | 6.5 | 3.25 | 30.51 | |
| | | | | | |
| | | | | | |
| | | | | | |

BHA SUB TOTAL 100.090

OK   Cancel   Help

FIG. 4B

PIPE TALLY VISION SYSTEM

CROSS-REFERENCE TO RELATED APPLICATIONS

This application is a non-provisional application which claims priority from U.S. provisional application No. 62/565,799, filed Sep. 29, 2017, which is incorporated by reference herein in its entirety.

TECHNICAL FIELD/FIELD OF THE DISCLOSURE

The present disclosure relates to methods and apparatuses for managing wellbore operations.

BACKGROUND OF THE DISCLOSURE

When performing a wellbore operation such as a drilling operation, a tubular string may be introduced into the wellbore. Typically, the tubular string includes a plurality of tubular members and other downhole tools joined end-to-end by threaded joints to extend into the wellbore. Each joint typically includes a region of increased diameter of the tubular string. Additionally, other tools may include areas of increased diameter above the rest of the tubular string. As used herein, the term "tool joint" refers to a connection between joints of drillpipe, which may be, but is not necessarily, characterized by a transition or upset from the nominal tubular diameter.

In many operations, the tubular string passes through a rotating control device (RCD) and a blowout preventer (BOP) as the tubular string enters the wellbore. An RCD is a device that channels fluid returning through the annulus of the wellbore about the tubular string into a return line, while maintaining a fluid seal against the rotating and translating tubular string. Typically, at least one seal within the RCD contacts the outer surface of the tubular string and is at risk for damage if a change in diameter of the tubular string occurs too quickly.

A BOP is a control device that allows the wellbore or an annulus of the wellbore around the tubular string to be closed off at the wellhead such as, for example and without limitation, in the event of a blowout. The BOP may include one or more rams positioned to engage and seal against the outer surface of the tubular string and one or more rams positioned to shear the tubular string to seal off the wellbore. If such an operation occurs with a joint aligned with one or more of the BOP rams, the wellbore may not be fully sheared.

Because the BOP and RCD are positioned beneath the drill floor, an operator may have difficulty directly observing the tubular string to determine the relative location between tool joints and the BOP or RCD.

Typically, specifications of the components of the tubular string including the position of tool joints and other wellbore equipment on the tubular string are logged manually into a pipe tally database. Such a process is laborious and not always effective as tubulars are not always the same length due to recuts and special order lengths.

SUMMARY

The present disclosure provides a method. The method may include positioning a pipe tally system on a drilling rig. The method may also include positioning a drill string within a wellbore using the drilling rig. The method may also include observing the drill string with the pipe tally system. The method may also include generating a pipe tally database with the pipe tally system

BRIEF DESCRIPTION OF THE DRAWINGS

The present disclosure is best understood from the following detailed description when read with the accompanying figures. It is emphasized that, in accordance with the standard practice in the industry, various features are not drawn to scale. In fact, the dimensions of the various features may be arbitrarily increased or reduced for clarity of discussion.

FIG. 4A depicts an example partial pipe tally database of a drill string generated by a pipe tally vision system consistent with at least one embodiment of the present disclosure.

FIG. 4B depicts an example partial pipe tally database of a drill string generated by a pipe tally vision system consistent with at least one embodiment of the present disclosure.

DETAILED DESCRIPTION

Figure 1:
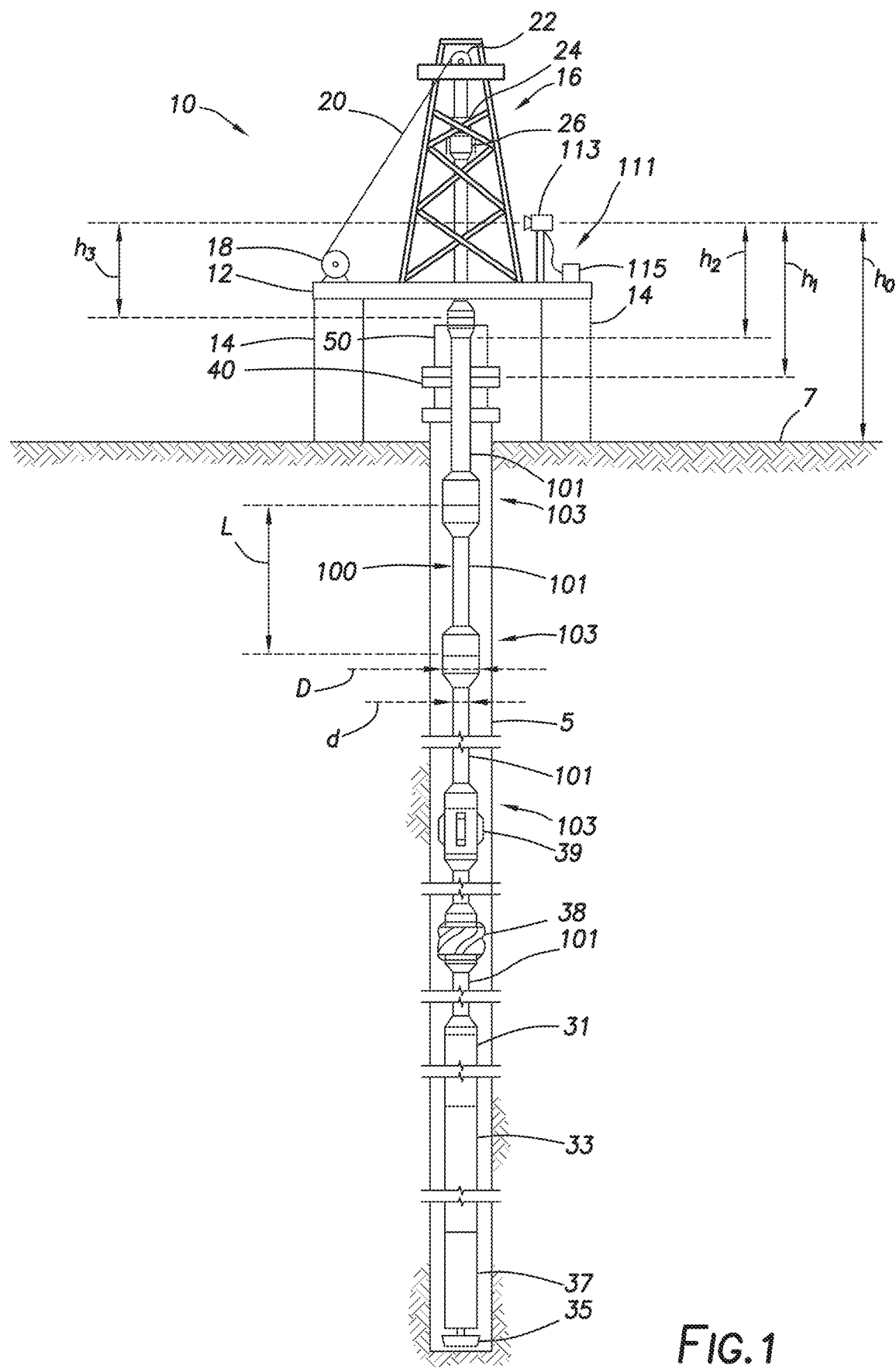
FIG. 1 is an overview of a drilling rig including a pipe tally vision system consistent with at least one embodiment of the present disclosure.

It is to be understood that the following disclosure provides many different embodiments, or examples, for implementing different features of various embodiments. Specific examples of components and arrangements are described below to simplify the present disclosure. These are, of course, merely examples and are not intended to be limiting. In addition, the present disclosure may repeat reference numerals and/or letters in the various examples. This repetition is for the purpose of simplicity and clarity and does not in itself dictate a relationship between the various embodiments and/or configurations discussed.

FIG. 1 depicts drilling rig 10 positioned to insert drill string 100 into wellbore 5. Drilling rig 10 may include rig floor 12 positioned above ground 7 by substructures 14. Drilling rig 10 may also include derrick or mast 16. In some embodiments, drilling rig 10 may include a lifting mechanism positioned to raise and support components of drill string 100 above rig floor 12. In some embodiments, drilling rig 10 may include drawworks 18 positioned to raise or lower drill string 100. Drawworks 18 may be adapted to pay out or pay in hoisting line 20. Hoisting line 20 may, in some embodiments, pass through crown block 22 to traveling block 24 which may include elevator or top drive 26. Elevator or top drive 26 may selectively couple to drill string 100 or components of drill string 100. In other embodiments, elevator or top drive 26 may be controlled using a rack and pinion carriage or hydraulic ram without deviating from the scope of this disclosure.

Drill string 100 may include one or more tubular members joined end to end to extend into wellbore 5. Drill string 100 may be made up of a plurality of drill pipes 101 forming a pipe section as well as heavy weight drill pipe section 31 and collar section 33. For the purposes of this disclosure, the tubular members are referred to as drill pipes 101. In some embodiments, drill string 100 may include other downhole tools including, for example and without limitation, drill bit 35, BHA 37, stabilizer 38 and reamer 39. Each drill pipe 101 may mechanically couple to adjacent drill pipes 101 or other tools by threaded connections, defined as tool joints 103, formed by the male threaded connector of one drill pipe 101 and the female threaded connector of an adjacent drill pipe 101. The ends of drill pipes 101 that make up tool joints 103 may be formed such that they have a larger diameter (indicated as diameter D) than the diameter of the rest of each drill pipe 101 (indicated as diameter d). The diameter of each component of drill string 100 may have different diameters. Additionally, each drill pipe 101 may be of a certain length L. Lengths L of each drill pipe 101 may vary depending on, for example and without limitation, specification of each drill pipe 101, manufacturing irregularities, repairs, wear, or other factors.

Figure 1A:
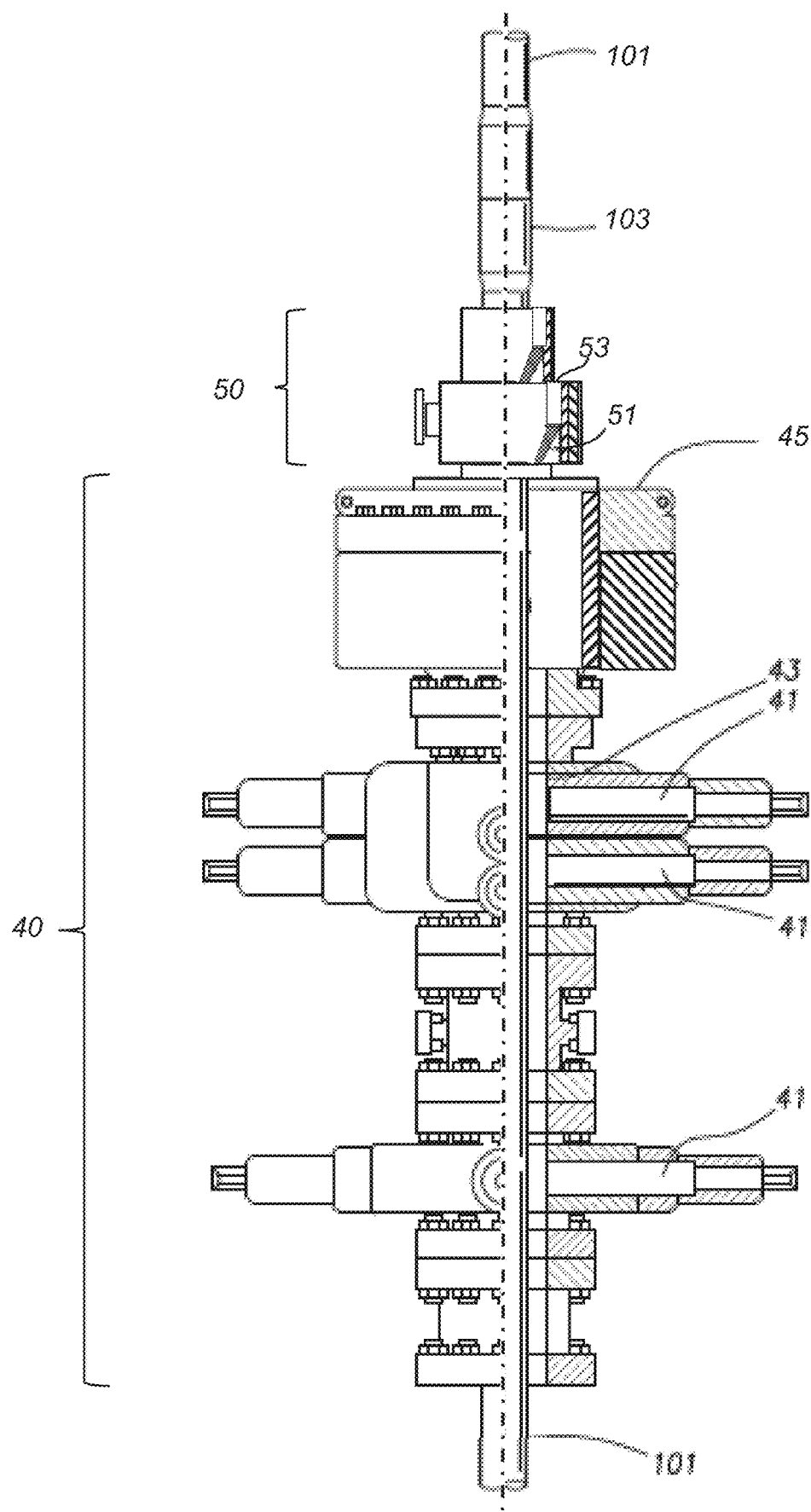
FIGS. 1A and 1B depict detail cross section views of the BOP and RCD of the drilling rig of FIG. 1 with a drill string positioned therein.
Figure 1B:
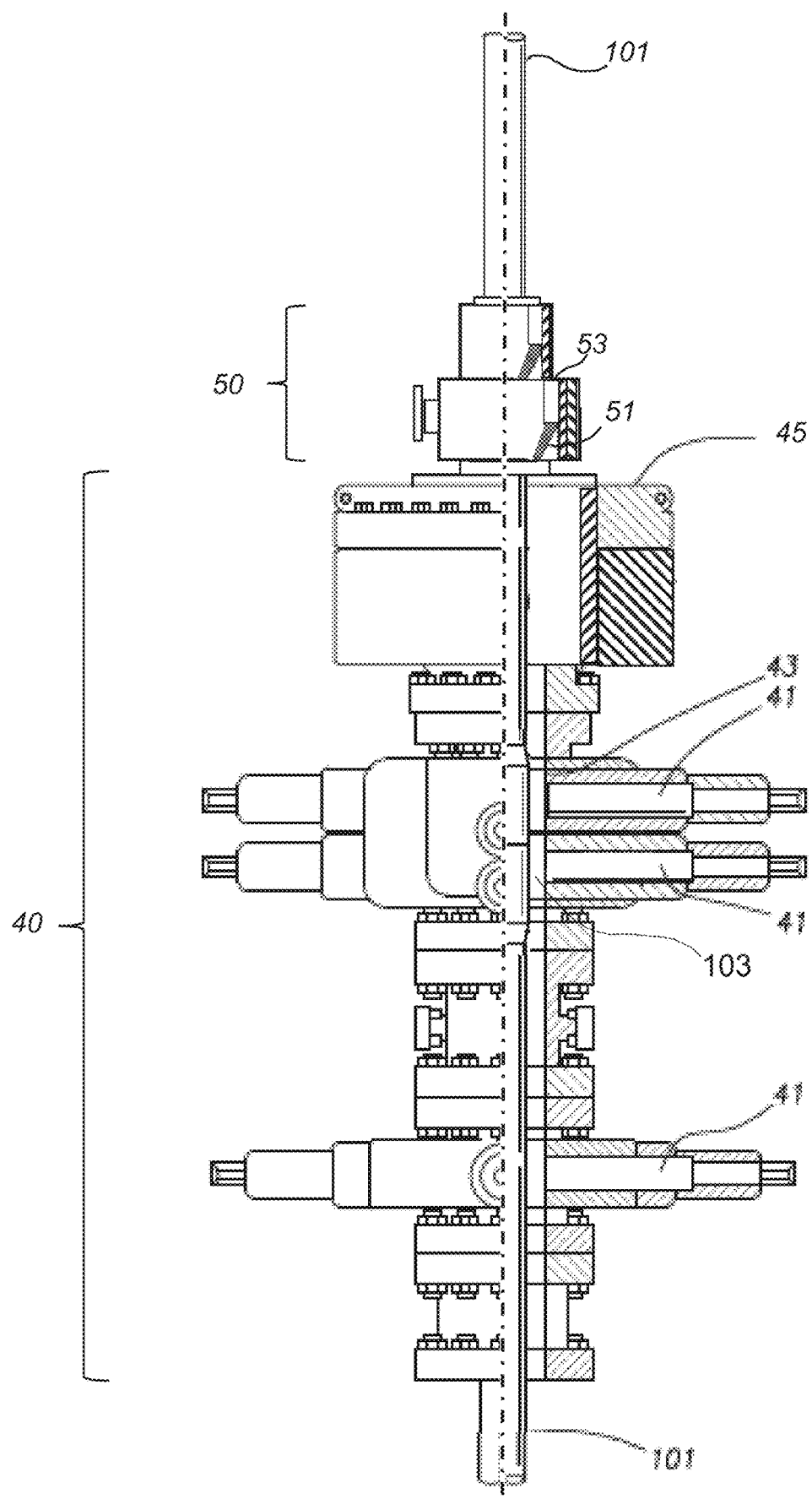

In some embodiments, drill string 100 may extend into wellbore 5 through BOP 40 and RCD 50. As depicted in FIGS. 1A, 1B, BOP 40 may include an annular preventer 45 and one or more rams 41 that are extendable inward into BOP bore 43 to selectively contact and seal the annular space about drill string 100. Rams 41 may be annular pipe rams or blind rams, shear rams, or blind shear rams, and may be implemented as fixed bore rams, variable bore rams, or otherwise. As depicted in FIG. 1B and discussed further herein below, where tool joint 103 between drill pipes 101 is aligned with one or more of rams 41, larger diameter D of tool joint 103 may interfere with the proper operation of rams 41, and may cause, for example and without limitation, incomplete sealing of BOP bore 43 due to improper sealing against drill string 100 in the case of an annular pipe ram or a failure to cut drill string 100 in the case of a blind ram.

In some embodiments, RCD 50 may include at least one RCD seal 51. RCD seal 51 may be rotatable relative to RCD housing 53. For purposes of the present discussion, in instances where there is more than one RCD seal, "RCD seal 51" should be understood to refer to the RCD seal that is closest to an approaching tool joint or upset from the nominal tubular diameter. RCD seal 51 may engage an outer surface of drill string 100 and seal thereagainst. In some embodiments, RCD seal 51 may be conical in shape such that fluid pressure within RCD housing 53 about drill string 100 forces RCD seal 51 against drill string 100. As drill string 100 passes through RCD seal 51, such as during a tripping in or tripping out, drilling, or reaming operation, RCD seal 51 changes shape to conform to a change in local diameter of drill string 100, such as when tool joint 103 passes through RCD seal 51. As further discussed herein below, too rapid a change in diameter of drill string 100 as drill string 100 moves through RCD seal 51 may cause damage to RCD seal 51 or loss of sealing between RCD seal 51 and drill string 100.

Figure 2:
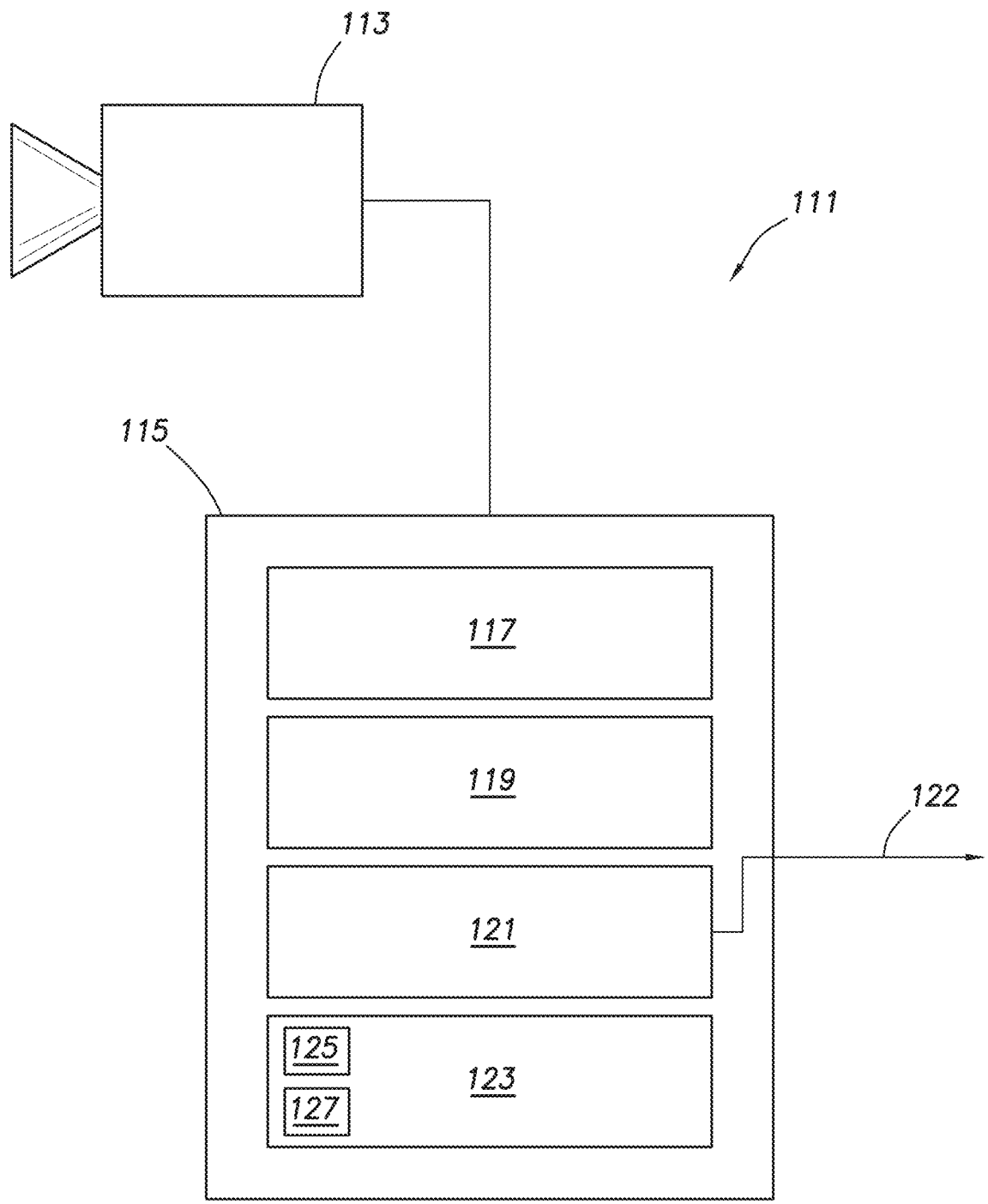
FIG. 2 depicts a schematic view of a pipe tally vision system consistent with at least one embodiment of the present disclosure.

In some embodiments, with reference to FIG. 1, drilling rig 10 may include pipe tally system 111. As used herein, the term "pipe tally system" refers to a system that is capable of measuring and/or detecting at least one feature of a tubular and generating an output based on the measurement and/or detection. Pipe tally system 111 may include at least one sensor 113 and controller 115. In some embodiments, sensor 113 may be positioned to observe and measure drill string 100 as drill string 100 is moved during drilling operations. Sensor 113 may be, for example and without limitation, a camera, 3D camera, LIDAR sensor, RADAR sensor, ultrasonic sensor, infrared thermal sensor, or combinations thereof. For example, in some embodiments, pipe tally system 111 may include a computer vision system. In some embodiments, one or more sensors 113 may be selected such that sensors 113 may operate during otherwise unfavorable conditions including, for example and without limitation, at night, during rain or other weather, through dusty conditions, etc. Although depicted as a single sensor 113 coupled to rig floor 12, multiple sensors 113 may be positioned anywhere on drilling rig 10 in view of drill string 100. In some embodiments, for example and without limitation, sensor 113 may be mechanically coupled to derrick or mast 16, a driller's cabin, or other structure coupled to or placed on drilling rig 10. Sensor 113 may be placed in a position above rig floor 12 or below rig floor 12. Sensor 113, as depicted in FIG. 2, may be operatively coupled to controller 115. In some embodiments, controller 115 may include one or more of processor 117, storage medium 119, communications system 121, and user interface 123.

Processor 117 may, for example and without limitation, be used to receive data from sensor 113 and perform computer program instructions stored on tangible, non-transitory, computer-readable memory media to process the data to determine parameters of drill string 100 as further discussed below. Processor 117 may also be used to perform computer program instructions stored on tangible, non-transitory, computer-readable memory media to signal or control other components of drilling rig 10 as further discussed below.

Storage medium 119 may be used to store computer program instructions, raw data from sensor 113, or parameters of drill string 100 such as a pipe tally database as further discussed below.

Communications system 121 may be used to transmit or otherwise make available information from pipe tally system 111, receive input controls from other systems, or to signal or control other components of drilling rig 10 through communications channel 122 as further discussed below.

User interface 123 may be used to provide an interface for a user to interact with pipe tally system 111. In some embodiments, user interface 123 may include display device 125 to indicate one or more conditions of operation of pipe tally system 111, parameters of drill string 100, or any other information from pipe tally system 111. Such a display device may include one or more of a screen, light, or control panel. In some embodiments, user interface 123 may include one or more controls 127 to allow a user to provide inputs to control operating conditions of pipe tally system 111.

Figure 3A:
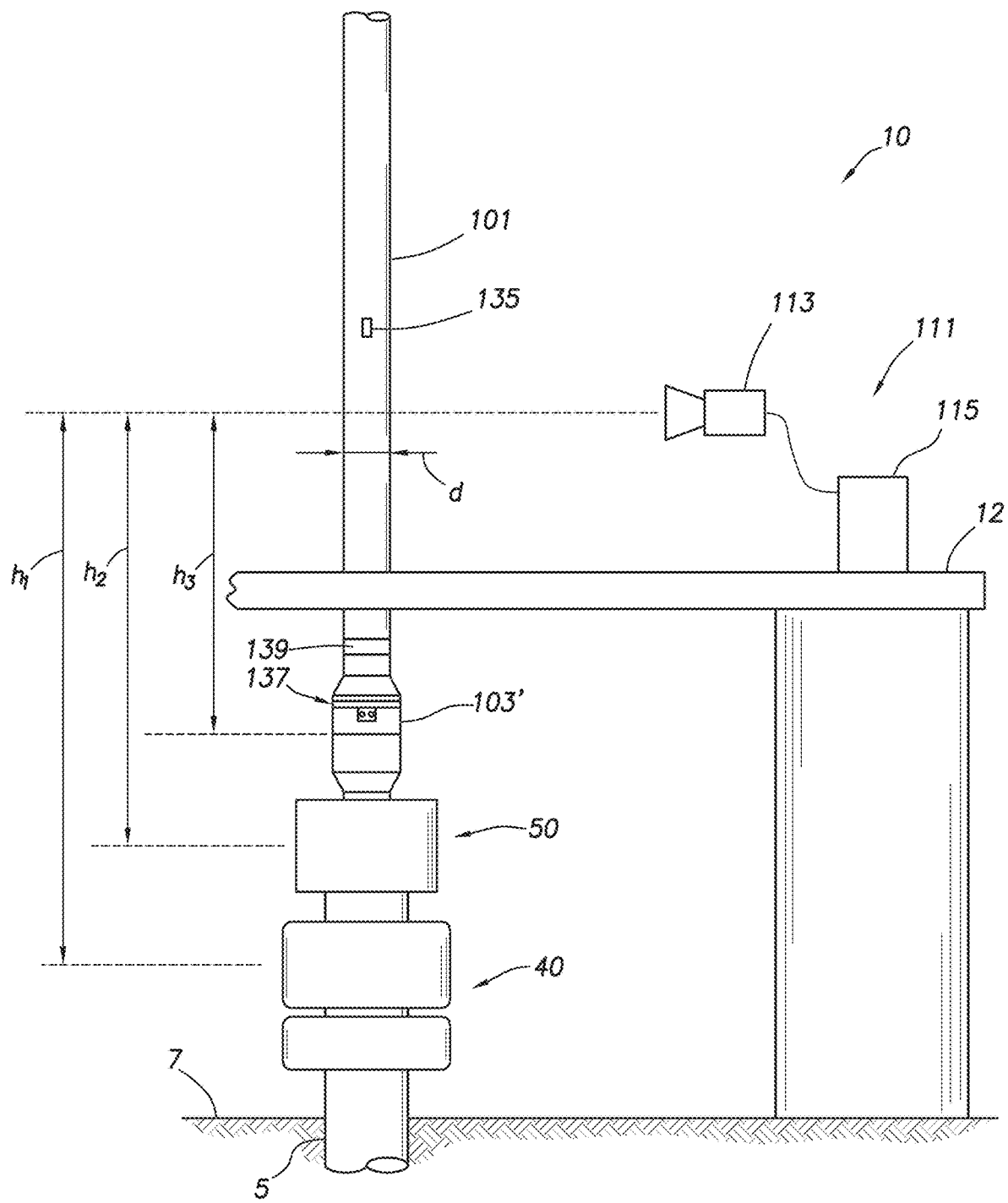
FIGS. 3A-3C depict side views of a pipe tally vision system consistent with at least one embodiment of the present disclosure measuring a drill string.
Figure 3B:
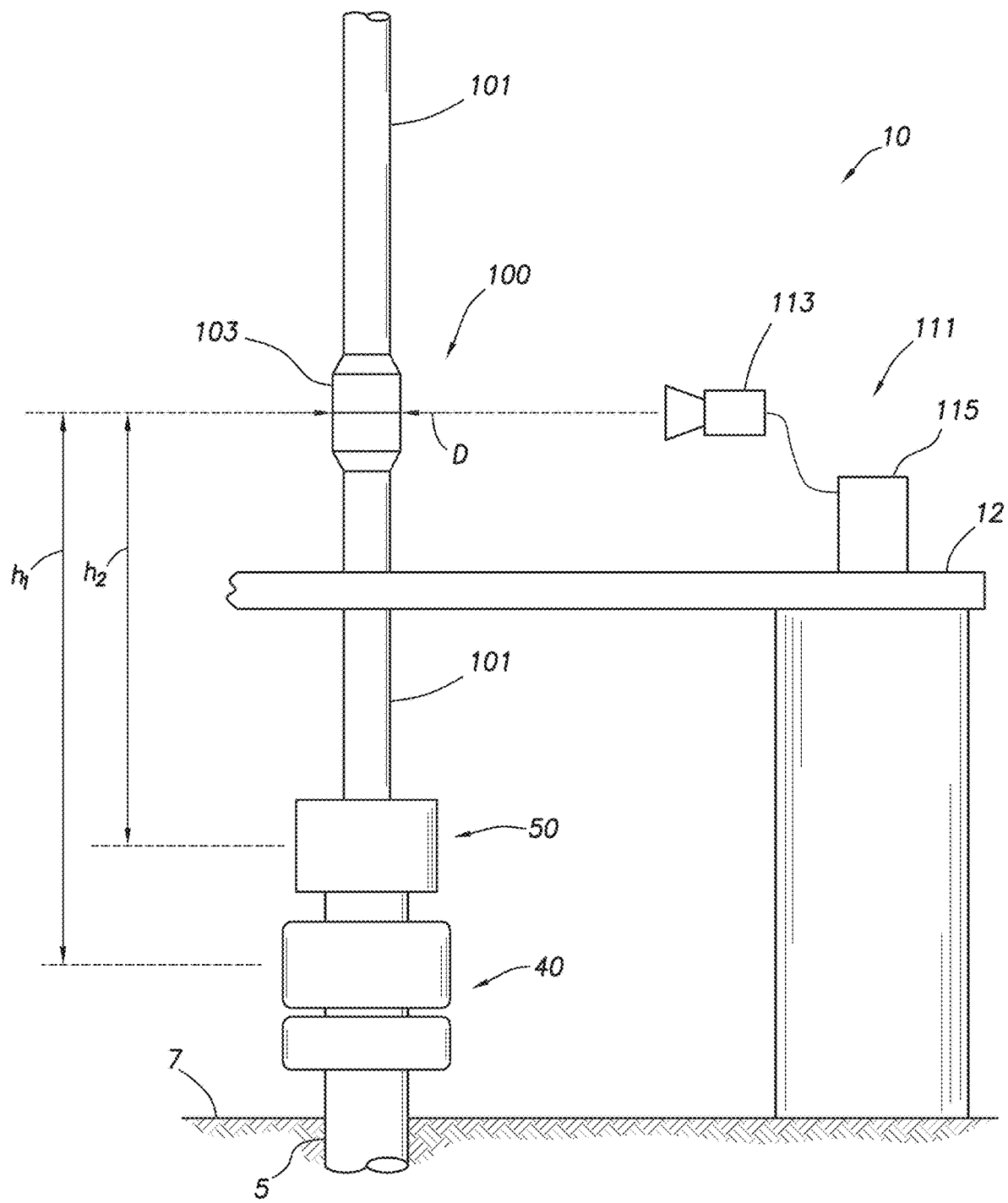
Figure 3C:
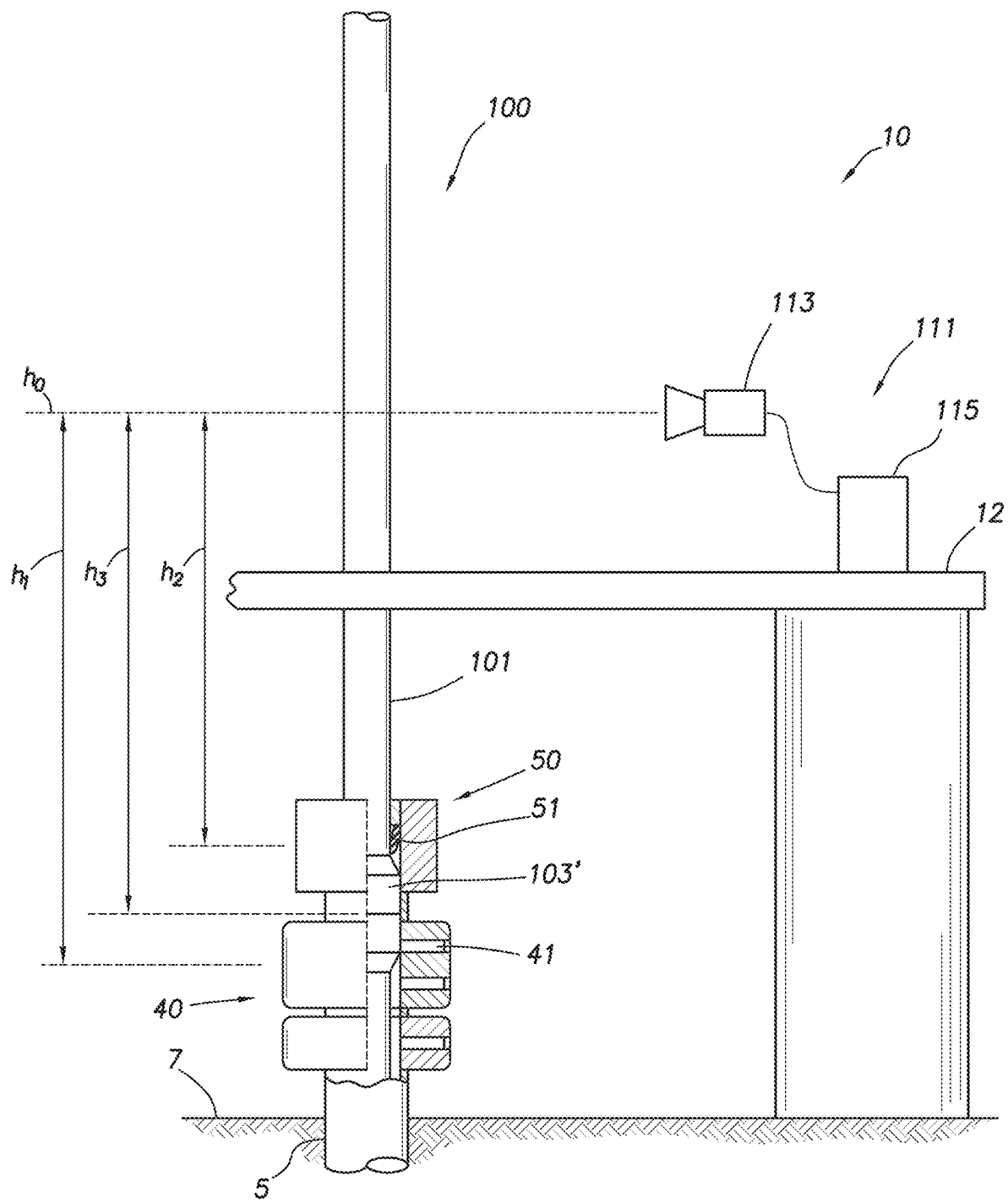

In some embodiments, as depicted in FIGS. 3A-3C, sensor 113 may be positioned on rig floor 12 and in view of drill string 100. Sensor 113 may observe drill string 100 as drill string 100 moves during an operation of drilling rig 10, such as tripping in, tripping out, drilling, reaming, or otherwise moving drill string 100. In some embodiments, sensor 113 may be positioned to detect one or more parameters of drill string 100 such as, for example and without limitation, one or more of the diameter d of a drill pipe 101 of drill string 100, the diameter D of a tool joint 103 of drill string 100, the length L of a drill pipe 101 of drill string 100, box and pin dimensions including thread number and pitch, size and style of tool joint 103, type of tool joint 103, upset angle and grade of tool joint 103, or combinations thereof. By way of example only, types of tool joints include various API connections such as regular, internal flush, and full hole, and various commercially-available premium connections. In some embodiments, sensor 113 may be used to identify one or more parameters of drill pipe 101 using one or more reference markers 135 positioned on drill pipe 101 such as, for example and without limitation, mill slot and grooves 137, color code bands 139 or other features, or other markers. In some embodiments, readings from sensor 113 may be used to identify drill pipe 101 or other downhole tool using a database of standard connection, tubular, and tool types.

In some embodiments, sensor 113 may be used to assess the condition of drill pipe 101 with respect to wear. In such an embodiment, sensor 113 may be used to detect or identify, for example and without limitation, one or more indicators of wear including dents, mashing, crushing, necking, cuts, gouges, diameter variations due to stretching or compression, corrosion, or cracks.

In some embodiments, sensor 113 may measure the parameter directly, such as the diameter d of drill pipe 101 or diameter D of tool joint 103. In such an embodiment, sensor data from sensor 113 may directly indicate the value of the parameter. For example, as depicted in FIG. 3A, the diameter d of drill pipe 101 aligned with sensor 113 may be determined by processor 117 by measuring the width of an image or other sensor data observed from sensor 113. Likewise, as depicted in FIG. 3B, the diameter D of tool joint 103 aligned with sensor 113 may be determined by processor 117 by measuring the width of an image or other sensor data observed from sensor 113.

In some embodiments, one or more sensors 113 may provide information gathered from observing drill string 100 to processor 117 of controller 115 to determine a parameter, such as the length L of drill pipe 101. In some such embodiments, processor 117 may be used to calculate one or more additional parameters from the sensor data. For example, as depicted in FIGS. 3A-3C, as drill string 100 moves downward relative to rig floor 12, observations by sensor 113 may be used to determine the velocity at which drill string 100 is moving. By measuring the velocity of drill string 100 and the time taken for the first tool joint 103 and second tool joint 103 of a given drill pipe 101 to pass sensor 113, the length L of drill pipe 101 may be determined. In some embodiments, velocity of drill string 100 may be determined by observing a marker or dimensional change on drill string 100 as it moves between readings from sensor 113.

Figure 3D:
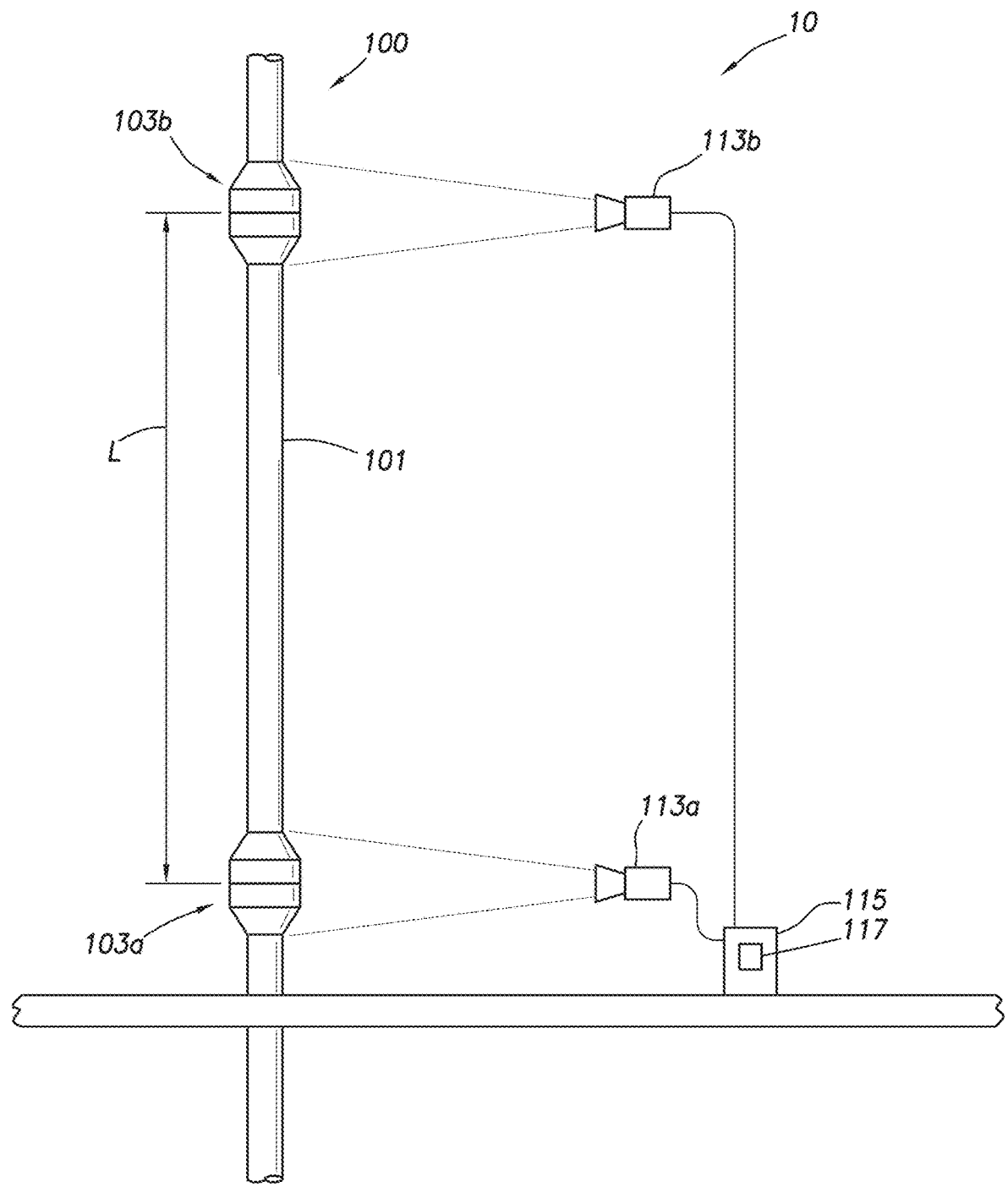
FIGS. 3D-3H depict side views of pipe tally vision systems consistent with at least one embodiment of the present disclosure.

In some embodiments, multiple sensors 113 may be positioned at different locations within drilling rig 10. In some embodiments, data from multiple sensors 113 may be combined to provide redundancy, calibration, fault detection, and error checking. In some embodiments, measurements from multiple sensors 113 may be selectively used to determine one or more parameters. For example, in some such embodiments, the length L of drill pipe 101 may be determined directly by two or more sensors 113. As depicted in FIG. 3D, a first sensor 113a may be positioned at a first location on drilling rig 10 and a second sensor 113b may be positioned at a second location on drilling rig 10, each positioned to observe drill string 100. In some embodiments, the first and second positions may be preselected such that the vertical distance between sensors 113a, 113b is known. By observing the position of first tool joint 103a with first sensor 113a and the position of second tool joint 103b with second sensor 113b, processor 117 of controller 115 may calculate the length L of drill pipe 101. In some embodiments, sensors 113a, 113b may operate continuously or may operate by taking snapshots at a desired interval. In some embodiments, multiple such snapshots may be used to, for example and without limitation, improve measurement accuracy.

Figure 3E:
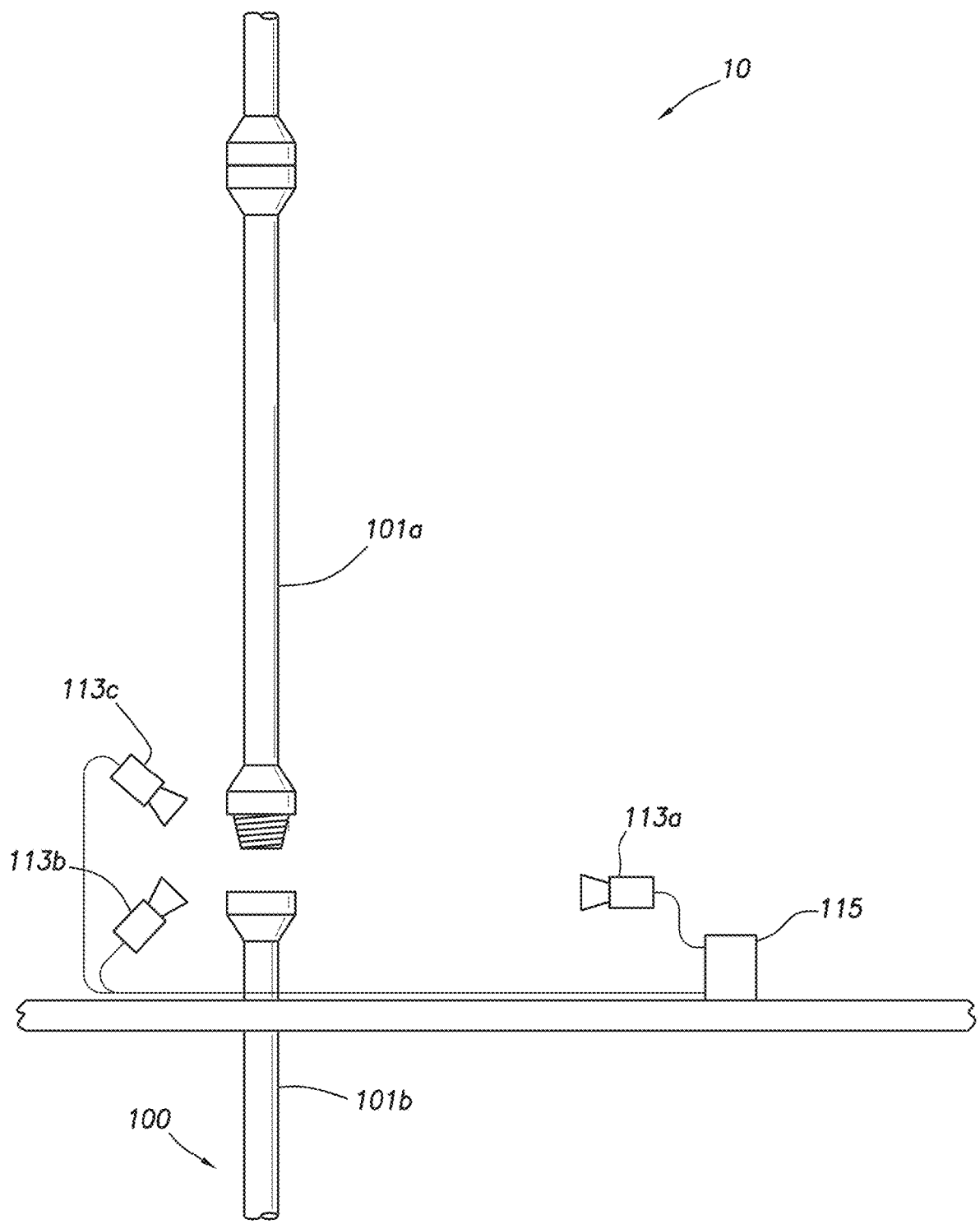

In some embodiments, certain measurements may be made using a particular sensor 113 based on the location of the selected sensor 113. For example, as depicted in FIG. 3E, first sensor 113a may be positioned at a larger distance from the drill string 100 than second sensor 113b. In some such embodiments, first sensor 113a may therefore be used for larger-scale measurements such as, for example and without limitation, determination of the location of tool joint 103. In some such embodiments, second sensor 113b may be positioned close to drill string 100 to, for example and without limitation, provide a closer and more detailed view of tool joint 103, and may therefore be used to determine smaller-scale measurements such as thread pitch or type or condition of drill pipe 101. In some embodiments, second sensor 113b may be positioned at an angle to more clearly observe a pin connection of upper drill pipe 101a as it is made up or broken out from the rest of drill string 100. In some embodiments, second sensor 113b or, as depicted in FIG. 3E, third sensor 113c may be positioned at an angle to more clearly observe a box connection of lower drill pipe 101b as upper drill pipe 101a is made up or broken out from lower drill pipe 101b.

Figure 3F:
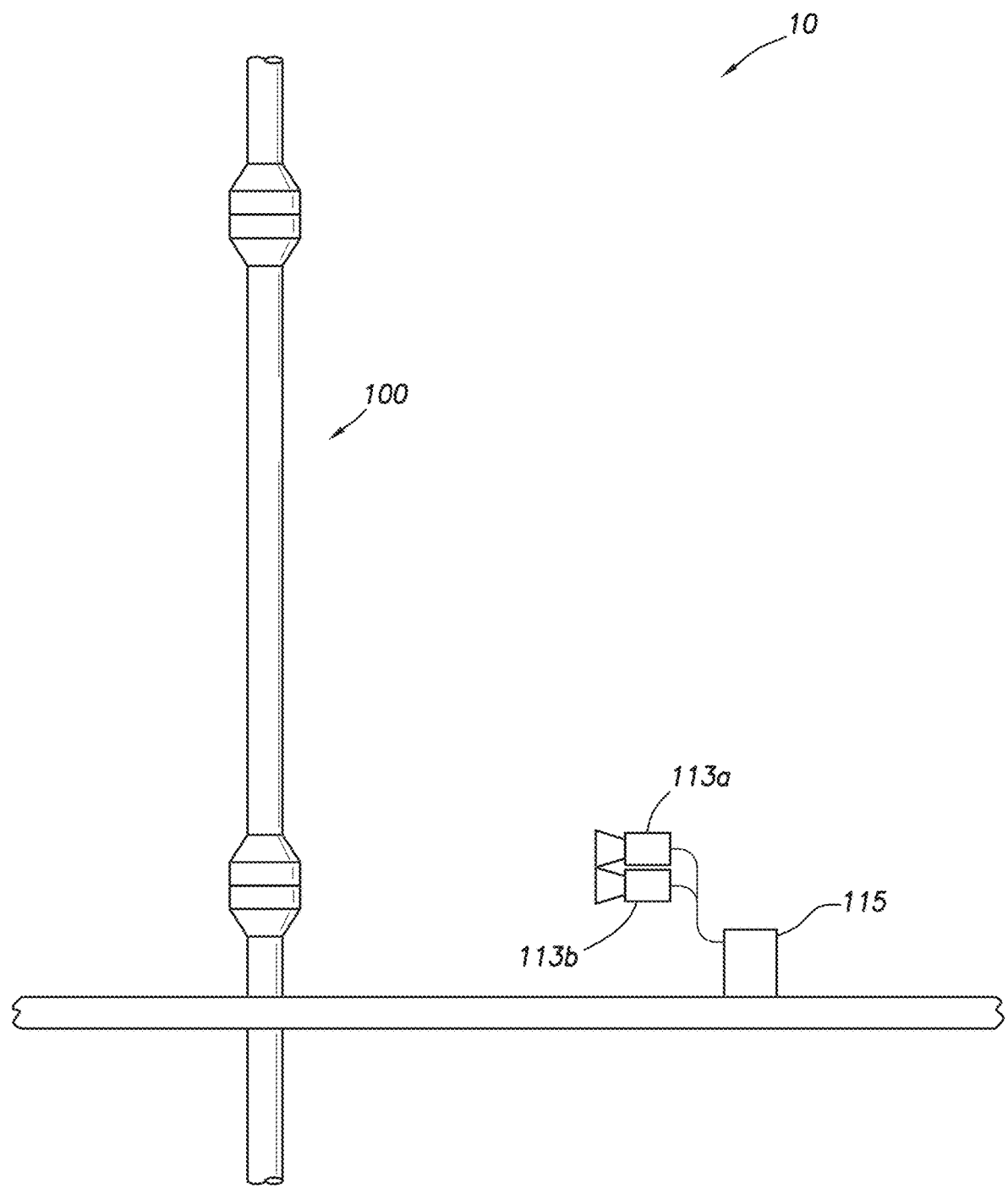

In some embodiments, certain measurements may be made with a particular sensor 113 based on the type of sensor. For example, as depicted in FIG. 3F, first sensor 113a and second sensor 113b may be positioned at or near the same location on drilling rig 10, but may be of different sensor type (e.g. a LIDAR sensor and an infrared thermal sensor respectively). Depending on operational conditions such as weather, time of day, and other conditions, one or both of first and second sensors 113a, 113b may be used selectively based on the particular characteristics of the sensor. In some embodiments, data from multiple sensors 113 may be used together by controller 115. For example and without limitation, where two sensors 113 are 2D cameras, a 3D image may be generated by controller 115.

Figure 3G:
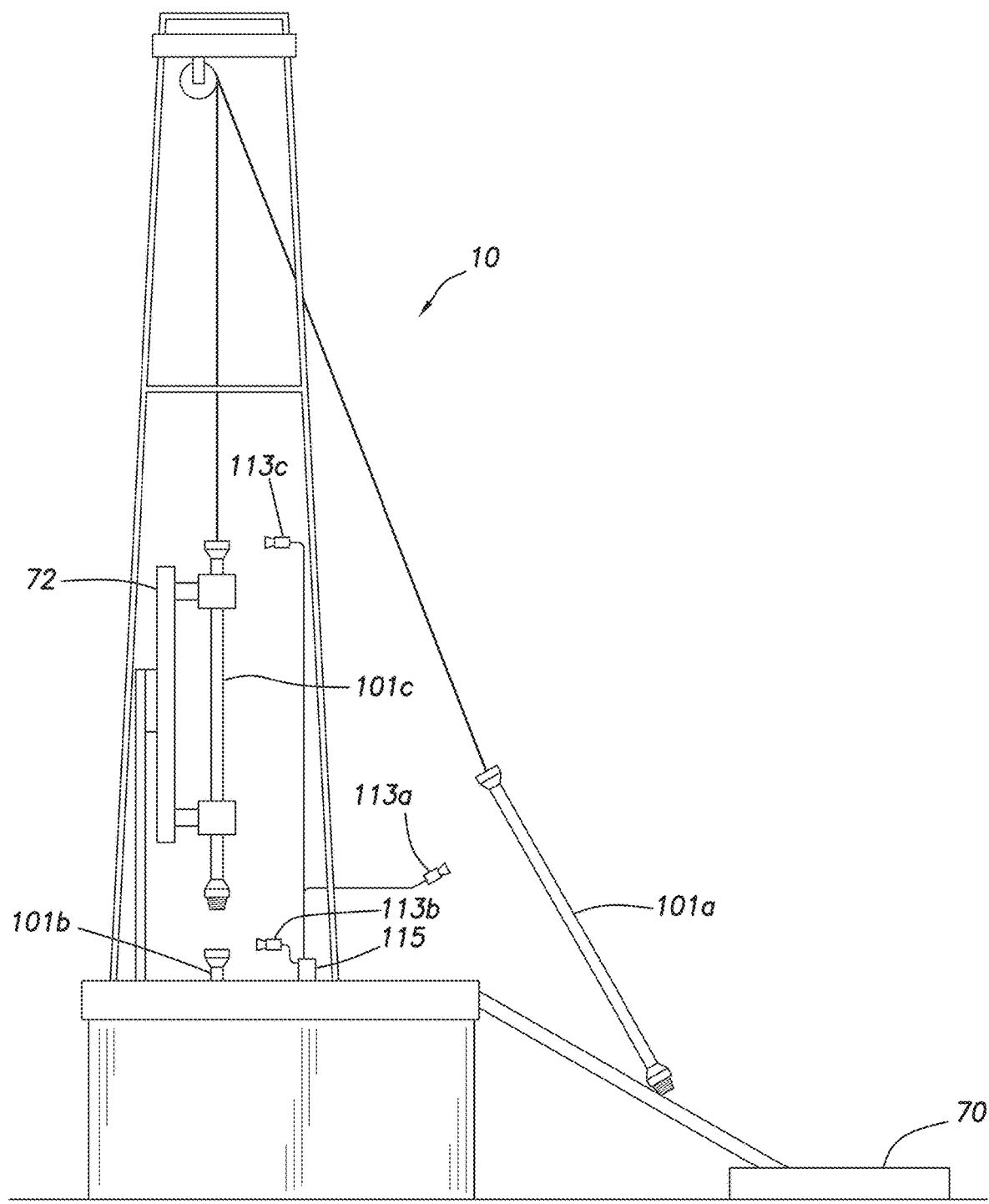
Figure 3H:
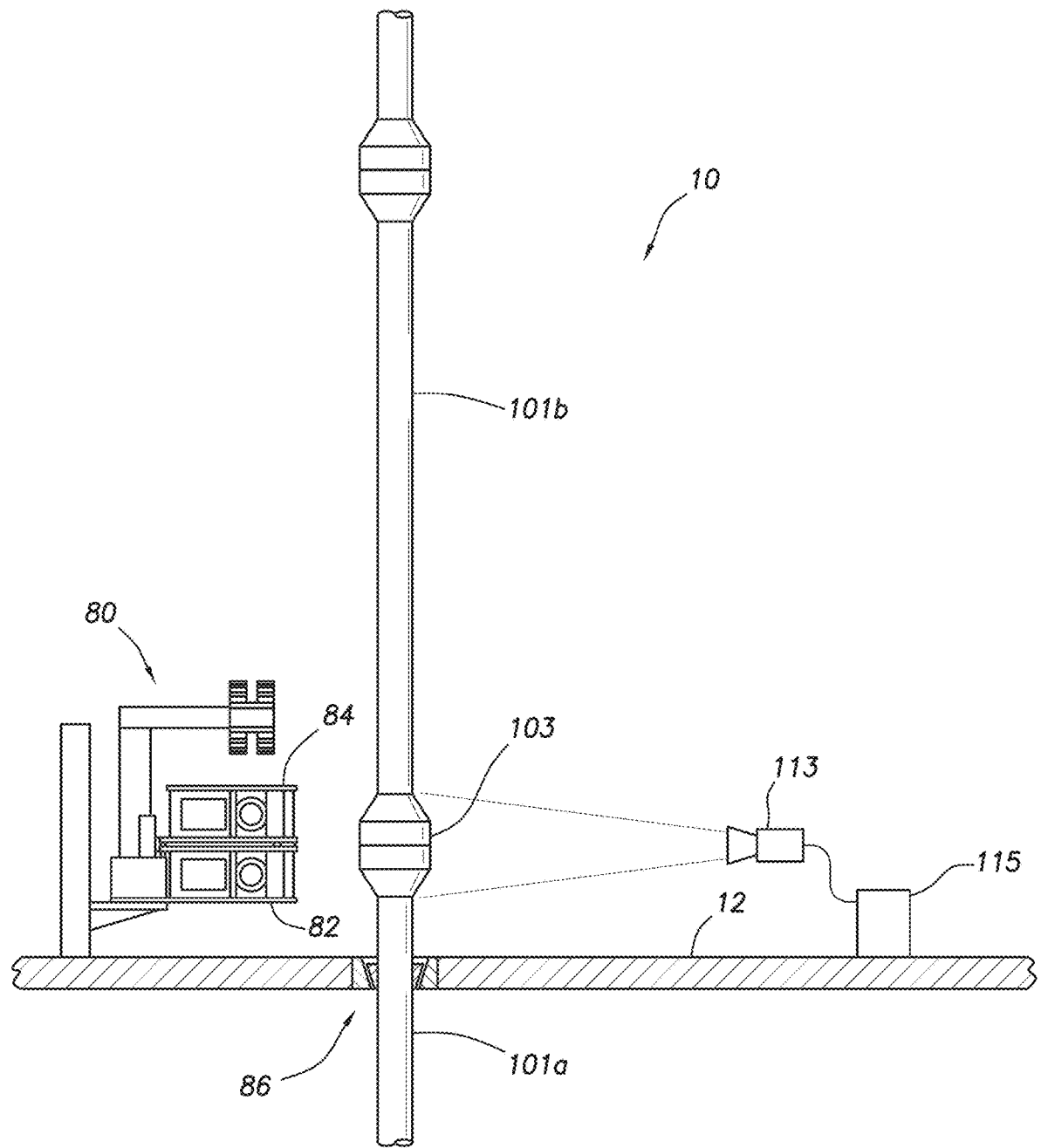

In some embodiments, as depicted in FIG. 3G, sensors 113 may be positioned at locations on drilling rig 10 to observe additional operations of drilling rig 10. For example and without limitation, in some embodiments, one or more sensors 113 may be positioned to observe aspects of drill pipes 101 while being picked up from catwalk 70, made into pipe stands, and stored in pipe racks. In some such embodiments, first sensor 113a may be positioned to observe drill pipe 101a being introduced into drilling rig 10 from catwalk 70. In some embodiments, second sensor 113b may be positioned to observe drill pipe 101b positioned in the mousehole of drilling rig 10. In some embodiments, third sensor 113c may be positioned to observe drill pipe 101c engaged by pipe handler 72.

In some embodiments, sensors 113 may be used to observe aspects of the operation of drilling rig 10 other than drill string 100. For example, sensors 113 may be used to assess weather conditions, to assess whether sensor 113 needs to be cleaned, to detect one or more people or things in the way of rig operations, or to assist in the operation of other rig systems such as a pipe tong, robotic arm, slips, or sensor calibration. In some embodiments, where an issue is detected, rig operations may be suspended in order to ensure the issue is safely rectified. For example, as depicted in FIG. 3G, sensor 113 may be used to assist in the operation of automated tong 80. In some embodiments, automated tong 80 may include backup tong 82 and makeup tong 84. Proper operation of automated tong 80 may require backup tong 82 and makeup tong 84 to align with drill string 100 such that backup tong 82 engages only lower drill pipe 101b and makeup tong 84 engages only upper drill pipe 101a to break out or make up tool joint 103 therebetween. Sensor 113 may measure the vertical height of tool joint 103 and the position of automated tong 80. In some embodiments, controller 115 may be operatively connected to automated tong 80 in order to properly position automated tong 80 in the proper alignment to tool joint 103. In some embodiments, sensor 113 may be used to ensure that tool joint 103 is aligned at a usable height above rig floor 12, i.e. a height at which automated tong 80 or any other pipe tong can reach tool joint 103 in order to make up or break out tool joint 103. In such an embodiment, once drill string 100 is properly aligned, slips 86 may be engaged to retain drill string 100 during the makeup or breakout procedure.

Figure 4A:
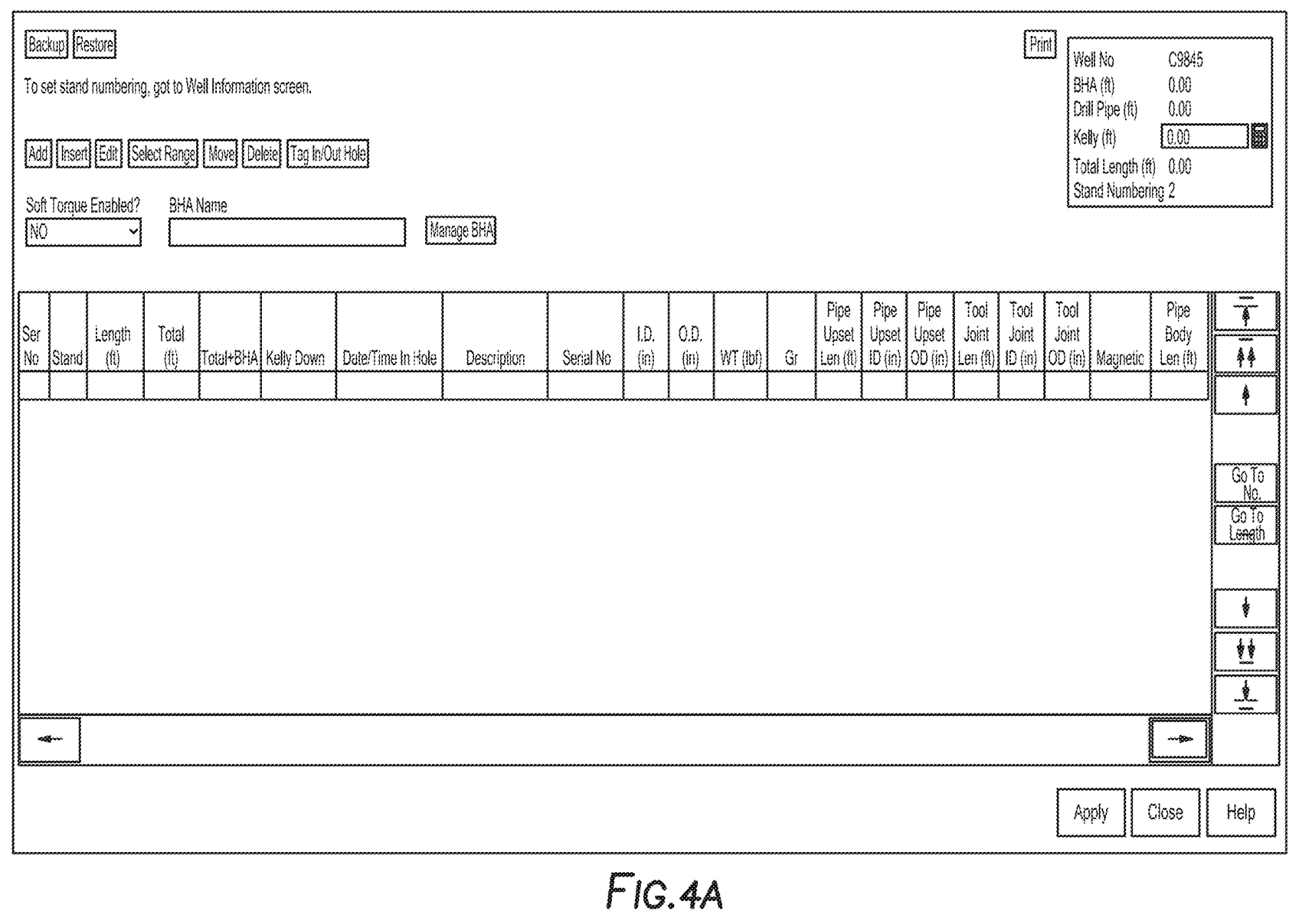

In some embodiments, pipe tally system 111 may use the parameters calculated from observations of sensor 113 to generate a pipe tally database. The pipe tally database may include information such as an identification of each component of drill string including each drill pipe 101, the type of each such component, the length of each drill pipe 101, the diameter of each drill pipe 101, the number of drill pipes 101 included in drill string 100, the overall length of drill string 100, and the positioning of drill string 100 and components thereof within wellbore 5 relative to drilling rig 10, the bottom of wellbore 5, or a downhole tool such as a casing shoe. FIGS. 4A and 4B depict examples of pipe tally databases of an example drill string 100.

In some embodiments, because sensor 113 directly measures components of drill string 100, a more accurate estimation of position of components of drill string 100 within wellbore 5 may be determined from the pipe tally database than from a pipe tally database entered manually or only using estimations of nominal component lengths. In some embodiments, because each drill pipe 101 is measured when added to drill string 100 when the drill pipe 101 is inserted into wellbore 5, the order of drill pipes 101 within drill string 100 may not affect the estimation of position of components of drill string 100 within wellbore 5. For example, while tripping in after a tripping out operation, if the order of drill pipes 101 is changed, the estimated position of drill string 100 within wellbore 5 may be different than expected with respect to features or locations within wellbore 5. By automatically measuring each drill pipe 101 when inserted into wellbore 5, a previous estimate of wellbore depth based on nominal pipe lengths may correspond more closely with the current estimate as actual lengths of drill pipes 101 are known. In some embodiments, by generating the pipe tally during a tripping in operation, the pipe tally database may be used during tripping out as discussed herein above to accurately account for the components of drill string 100 as drill string 100 is removed from wellbore 5.

In some embodiments, as depicted in FIGS. 1 and 3A-3C, sensor 113 may be positioned at a known height h0. For the purposes of this disclosure, height h0 is defined with respect to ground 7. In some embodiments, the distances between sensor 113 and BOP 40 (denoted h1) and between sensor 113 and RCD 50 (denoted h2) may be known.

In some embodiments, pipe tally system 111 may be used to ensure reliable operation of BOP 40 during an activation of one or more rams 41 of BOP 40. Based on the pipe tally database generated by pipe tally system 111, the position or relative depth, denoted h3, of the first tool joint 103 below the lowermost RCD seal 51, defined as uppermost tool joint 103', may be accurately known. For example, the following table depicts select information extracted from an example pipe tally database:

TABLE 1

EXTRACT FROM EXAMPLE PIPE TALLY DATABASE

| COMPONENT INDEX # | TYPE | ID | LENGTH | OD | JOINT OD | REL. DEPTH |
|---|---|---|---|---|---|---|
| 156 | DRILL PIPE | DP146 | 30.3 | 5 | 7 | −22.7 |
| 157 | DRILL PIPE | DP147 | 30 | 5 | 7 | +7.3 |

For the example drill string of Table 1, the upper end of drill pipe DP 146 is 22.7' below the level of sensor 113. In the event that BOP 40 is to be actuated, pipe tally system 111 may determine whether uppermost tool joint 103' is aligned with BOP 40, i.e. where the relative depth h3 is approximately the distance h1 between sensor 113 and BOP 40. Where the uppermost tool joint 103' is not aligned with BOP 40, i.e. where h3 is not approximately equal to h1 as depicted in FIGS. 3A and 3B, BOP 40 may be activated reliably as uppermost tool joint 103' is not in a position to interfere with rams 41.

In the case that uppermost tool joint 103' is aligned with BOP 40, i.e. where h3 is approximately equal to h1 (where h1 is approximately 22.7' for the example in Table 1) as depicted in FIG. 3C, pipe tally system 111 may intervene in the actuation of BOP 40. In some embodiments, pipe tally system 111 may issue an alert through display device 125 of user interface 123 to indicate that uppermost tool joint 103' may interfere with BOP 40. In some embodiments, pipe tally system 111 may issue a command with communications system 121 to drawworks 18 to raise or lower drill string 100 to remove uppermost tool joint 103' from alignment with BOP 40 before BOP 40 is activated.

Figure 5:
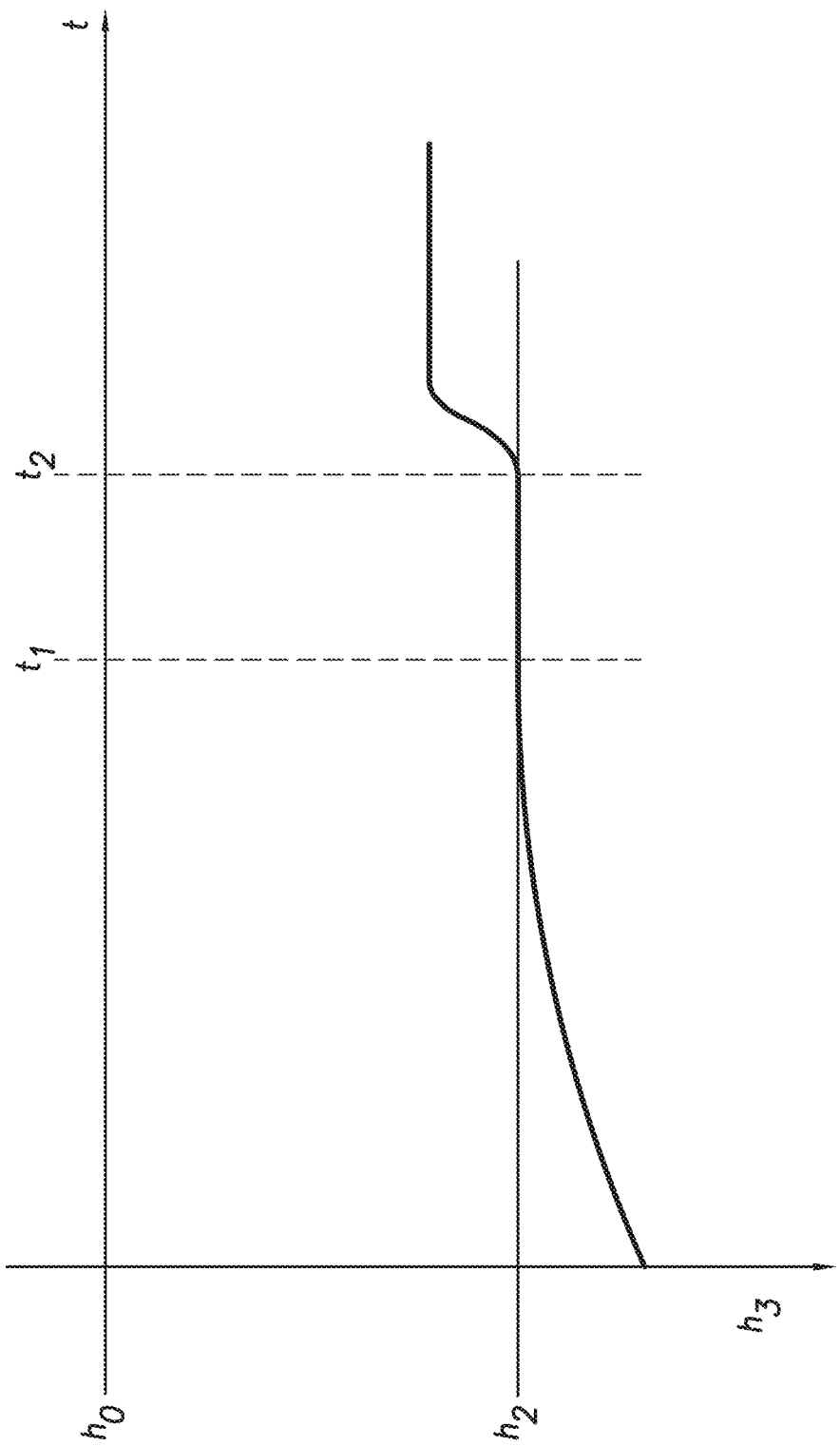
FIG. 5 depicts an example chart of tool joint position in time during an operation of a pipe tally vision system consistent with at least one embodiment of the present disclosure.

For example, as depicted in FIG. 5, where, during a trip out operation, drill string 100 is positioned such that h3 is approximately equal to h1, i.e. uppermost tool joint 103' is aligned with BOP 40, where BOP 40 is desired to be activated at time t1, pipe tally system 111 may determine that h3 is approximately equal to h1, and command drill string 100 to be raised such that uppermost tool joint 103' is above BOP 40, such movement occurring at time t2 as depicted.

Figure 6A:
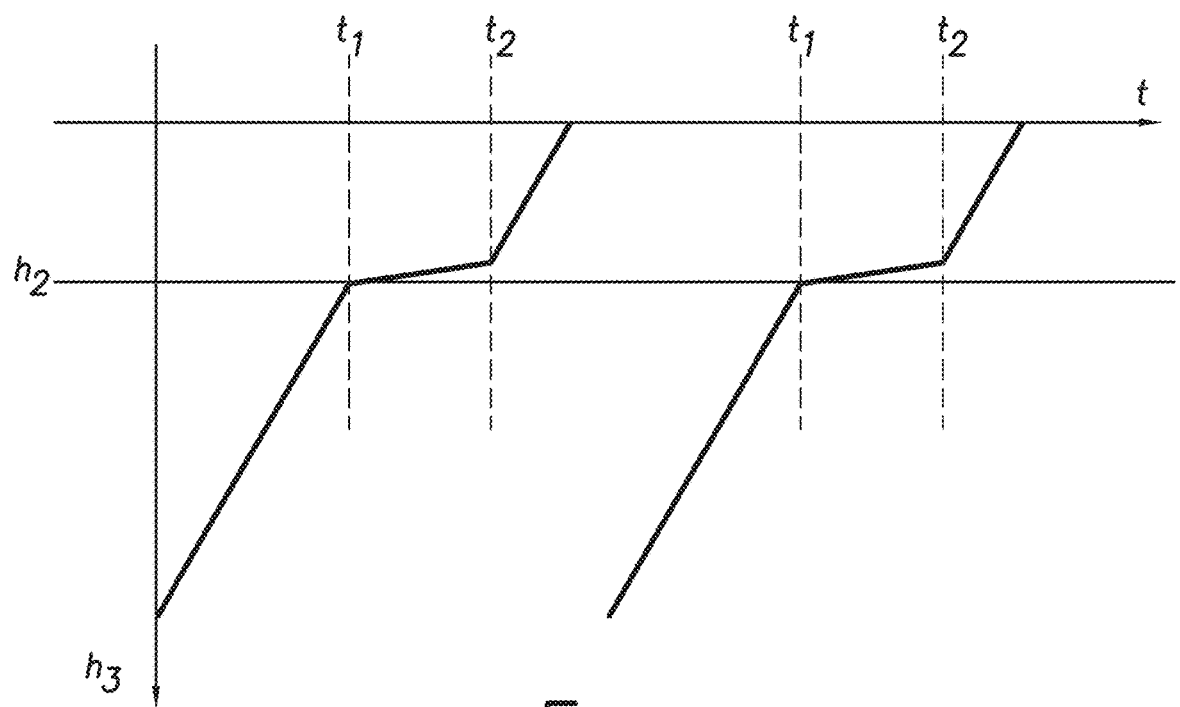
FIGS. 6A and 6B depict example charts of tool joint position in time and tool string velocity in time, respectively, of a pipe tally vision system consistent with at least one embodiment of the present disclosure.
Figure 6B:
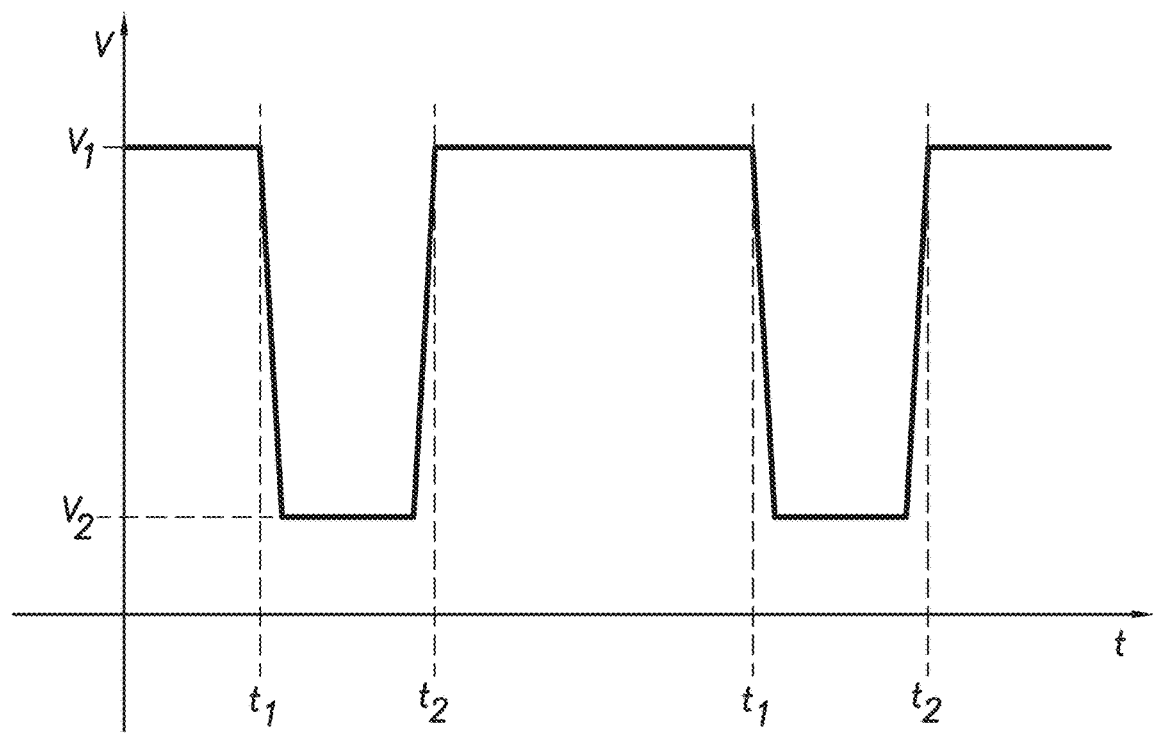

In some embodiments, pipe tally system 111 may be used to reduce wear on the seal or seals of RCD 50. Because tool joints 103 of drill string 100 are of larger diameter than the diameter of the rest of drill pipes 101, RCD seal 51 needs to expand to conform to the increased diameter of drill string 100 as tool joints 103 pass through RCD 50 and contract to conform to the decreased diameter of drill string 100 as tool joints 103 leave RCD 50. In such an embodiment, as drill string 100 is moved into or out of wellbore 5, pipe tally system 111 may continuously operate and therefore know the position of the tool joint 103' that is in closest proximity to the RCD with respect to the direction of drill string travel or any other transition in diameter of drill string 100 relative to RCD seal 51. When pipe tally system 111 determines that tool joint 103' is approaching RCD seal 51, the velocity at which drill string 100 is moved into or out of wellbore 5 may be slowed to give RCD seal 51 more time to conform to the increased diameter of tool joint 103'. For example, FIGS. 6A and 6B depict a part of a tripping out procedure. In this embodiment, drill string 100 is tripped out at a first velocity V1. As h3 approaches h2 at t1, pipe tally system 111 may command the velocity V at which drill string 100 is being raised to be reduced to a second velocity V2 lower than the first velocity V1. Once tool joint 103' passes through RCD 50, the velocity at which drill string 100 is tripped out may be increased again to the first velocity V1 at time t2.

In some embodiments, the velocity V may be reduced only for the period of time in which RCD seal 51 is transitioning between different diameter components of drill string 100, and therefore drill string 100 would return to a higher velocity for the length of tool joint 103'. Velocity V may again decrease to a lower velocity when RCD seal 51 transitions from the larger diameter D of tool joint 103' to the smaller diameter d of drill pipe 101, and then increase to the higher velocity for the length of drill pipe 101.

Figure 7:
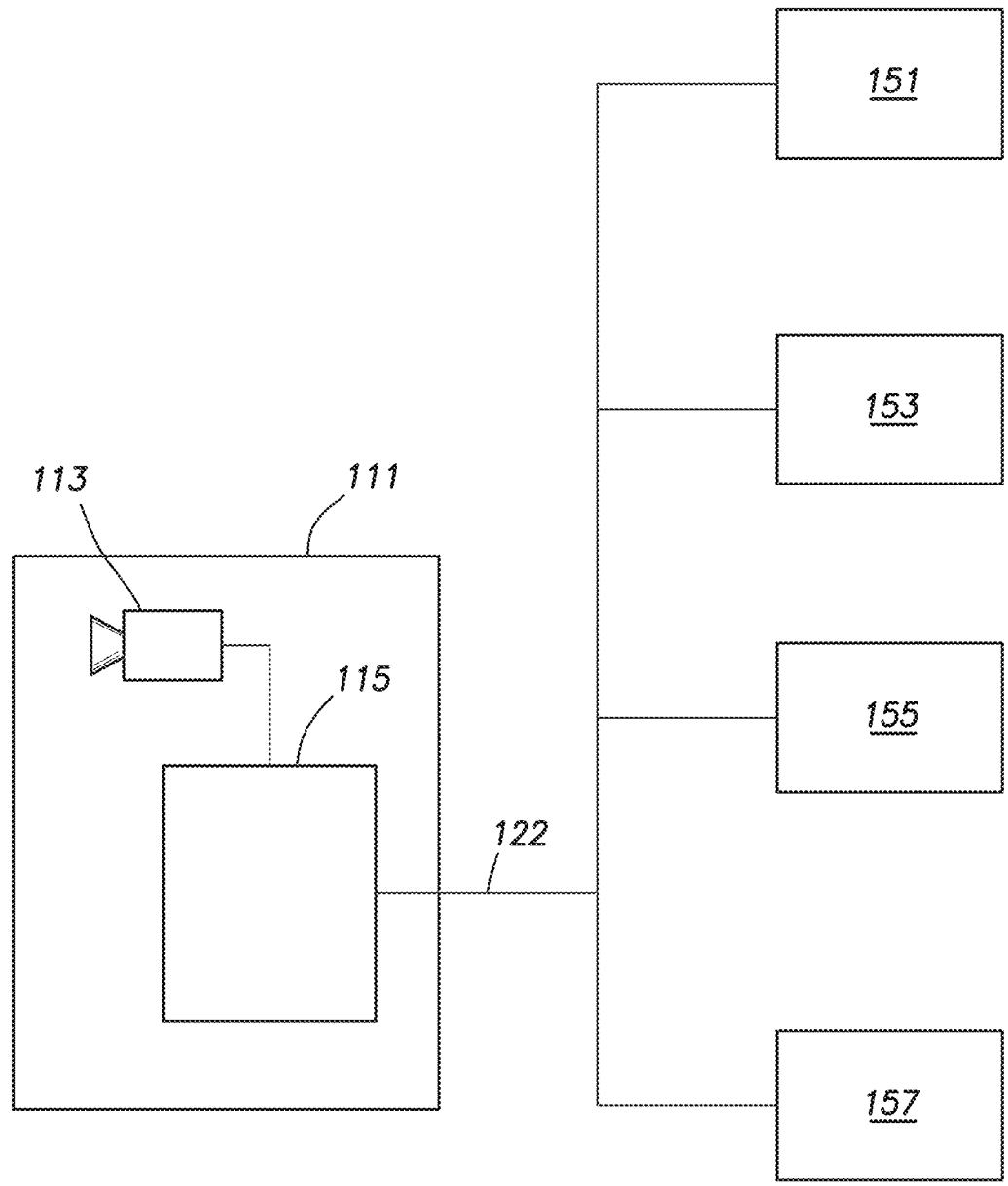
FIG. 7 depicts a schematic view of a drilling rig including a pipe tally vision system consistent with at least one embodiment of the present disclosure.

In some embodiments, pipe tally system 111 may receive data from other systems of drilling rig 10 through communications channel 122. For example, in some embodiments, as depicted in FIG. 7, pipe tally system 111 may be in communication with additional sensors positioned in drilling rig 10 or other information available from other systems of drilling rig 10, such as, for example and without limitation, one or more rig based load cells 151, drill string based load sensors 153, hoisting system controllers 155, or rig control systems. In some embodiments, pipe tally system 111 may be used to validate or calibrate measurements from the other systems of drilling rig 10. In some embodiments, pipe tally system 111 may be calibrated using measurements from the other systems of drilling rig 10.

In some embodiments, one or more rig based load cells 151 may be positioned at a location on drilling rig 10 or an associated component to detect a change in load on drill string 100 that may indicate that a tool joint 103' is entering or leaving RCD 50. Rig based load cells 151 may be positioned at one or more of, for example and without limitation, elevator or top drive 26, traveling block 24, crown block 22, a dead line anchor, or within RCD 50 itself. Where the rig based load cell 151 is positioned within RCD 50, such a rig based load cell 151 may be positioned on RCD housing 53 or within a component within RCD 50. In some embodiments, one or more drill string based load sensors 153 may be positioned at a location on drill string 100, such as in one or more drill pipes 101, in a component above drill pipes 101, in a Kelly pipe, or in a tool within drill string 100. Such a drill string based load sensor 153 may detect a change in load on drill string 100 that may indicate that the tool joint 103' is entering or leaving RCD 50.

In some embodiments, pipe tally system 111 may receive information from one or more hoisting system controllers 155. Hoisting system controller 155 may drive the operation of drawworks 18, motors in a rack-and-pinion carriage, or pressure to a hydraulic cylinder based hoisting system. In some embodiments, hoisting system controller 155 may provide data to pipe tally system 111 to indicate the load on drill string 100. For example, hoisting system controller 155 may provide the torque of a motor in the hoisting system, the drive voltage or current supplied to a motor in the hoisting system, or the pressure or drive system pressure of a hydraulic hoisting system component. In some embodiments, hoisting system controller 155 may also provide information on, for example and without limitation, position and movement of drill string 100 relative to drilling rig 10. For example, in some embodiments, hoisting system controller 155 may provide pipe tally system 111 with the height of traveling block 24 or the velocity at which traveling block 24 is moving. In some embodiments, hoisting system controller 155 may receive commands from pipe tally system 111 as described herein above. In some embodiments, measurements made by pipe tally system 111 may be used to validate or calibrate the measured movement of drawworks 18, traveling block 24, or drill string 100.

The foregoing outlines features of several embodiments so that a person of ordinary skill in the art may better understand the aspects of the present disclosure. Such features may be replaced by any one of numerous equivalent alternatives, only some of which are disclosed herein. One of ordinary skill in the art should appreciate that they may readily use the present disclosure as a basis for designing or modifying other processes and structures for carrying out the same purposes and/or achieving the same advantages of the embodiments introduced herein. One of ordinary skill in the art should also realize that such equivalent constructions do not depart from the scope of the present disclosure and that they may make various changes, substitutions, and alterations herein without departing from the spirit and scope of the present disclosure.

What is claimed is:

1. A method comprising:
    a) positioning a pipe tally system on a drilling rig;
    b) positioning a drill string within a wellbore using the drilling rig, wherein the drill string passes through a rotating control device (RCD) having at least one seal as the drill string enters or exits the wellbore;
    c) moving the drill string into or out of the wellbore;
    d) observing the drill string with the pipe tally system as the drill string moves past the pipe tally system;
    e) generating a pipe tally database with the pipe tally system using data collected in step d);
    i) moving the drill string at first velocity;
    ii) determining the position of the tool joint of the drill string in closest proximity to the RCD with respect to the direction of drill string travel; iii) determining that a transition in diameter of the drill string is approaching the RCD; and iv) moving the drill string at a second velocity, the second velocity slower than the first velocity until the transition in diameter of the drill string is past the seal of the RCD.

2. The method of claim 1 wherein the drill string comprises a plurality of tubulars connected by tool joints, wherein the drill string passes through a blowout preventer (BOP) as the drill string enters the wellbore, further comprising:
    f) determining the position of the next tool joint of the drill string below the lowermost RCD seal;
    g) determining whether the first tool joint of the drill string below the lowermost RCD seal is aligned with a ram assembly of a blowout preventer (BOP), and if the first tool joint of the drill string below the lowermost RCD seal is aligned with the blowout preventer:
    h) moving the drill string up or down such that the first tool joint of the drill string below the lowermost RCD seal is not aligned with the BOP; and
    i) activating the BOP.

3. The method of claim 1, further comprising moving the drill string at the first velocity after the transition in diameter is past the seal of the RCD.

4. The method of claim 1 wherein step iii) comprises using a load cell to detect a change in a load on the drill string that indicates that the tool joint in closest proximity to the RCD with respect to the direction of drill string travel is entering or leaving the RCD.

5. The method of claim 1, further including using information in the pipe tally database to calculate the cumulative length of drill pipe that has been inserted into the wellbore, and further comprising comparing the calculated cumulative length to a previous estimate of wellbore depth based on nominal pipe lengths.

6. The method of claim 1, further including generating a pipe tally during a tripping-in operation and using the pipe tally during a tripping-out operation to accurately account for the components of the drill string as the drill string is removed from wellbore.

7. The method of claim 1 wherein the drill string comprises a plurality of tubulars connected by tool joints, wherein observing the drill string comprises measuring at least one parameter selected from the group consisting of: the diameter of a drill pipe of the drill string, the diameter of a tool joint of the drill string, the length of a drill pipe of the drill string, the velocity of the drill string, the box and pin dimensions of a tool joint, the type of tool joint, the size and style of the tool joint, the upset angle of the tool joint, and the grade of the tool joint.

8. The method of claim 1, wherein the pipe tally system comprises a sensor and a controller.

9. The method of claim 8 wherein the sensor comprises a camera, 3D camera, LIDAR sensor, RADAR sensor, ultrasonic sensor, or infrared thermal sensor.

10. The method of claim 9 wherein the pipe tally database comprises the length, diameter, tool joint diameter, and position relative to the pipe tally system of each drill pipe of the drill string.

11. The method of claim 9 wherein the sensor is positioned above or below a rig floor of the drilling rig.

* * * * *